(12) United States Patent
Ikeya et al.

(10) Patent No.: US 10,576,661 B2
(45) Date of Patent: Mar. 3, 2020

(54) MATERIAL KNEADING APPARATUS AND MATERIAL KNEADING METHOD

(75) Inventors: Manabu Ikeya, Hiroshima (JP); Makoto Ishikawa, Hiroshima (JP); Reo Fujita, Hiroshima (JP); Seiji Takamoto, Hiroshima (JP); Shigeki Inoue, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 1211 days.

(21) Appl. No.: 14/122,086

(22) PCT Filed: May 30, 2012

(86) PCT No.: PCT/JP2012/063908
§ 371 (c)(1),
(2), (4) Date: Nov. 25, 2013

(87) PCT Pub. No.: WO2012/165469
PCT Pub. Date: Dec. 6, 2012

(65) Prior Publication Data
US 2014/0098626 A1    Apr. 10, 2014

(30) Foreign Application Priority Data

May 30, 2011    (JP) .................................. 2011-119941

(51) Int. Cl.
*B29B 7/42*    (2006.01)
*B29B 7/48*    (2006.01)
(Continued)

(52) U.S. Cl.
CPC ............... *B29B 7/42* (2013.01); *B29B 7/465* (2013.01); *B29B 7/482* (2013.01); *B29B 7/489* (2013.01);
(Continued)

(58) Field of Classification Search
CPC ............ B29C 47/6025; B29C 47/6037; B29C 47/6075; B29B 7/42
(Continued)

(56) References Cited

U.S. PATENT DOCUMENTS 1,762,368 A  *  6/1930  Vandergrift ............. B29C 47/38
                                                          100/149
2,615,199 A     10/1952  Fuller
(Continued)

FOREIGN PATENT DOCUMENTS

CN    101223014 A    7/2008
EP    1 048 433 A2   11/2000
(Continued)

OTHER PUBLICATIONS

Search Report dated Aug. 13, 2014 issued by the European Patent Office in counterpart European Patent Application No. 12793551.8.
(Continued)

*Primary Examiner* — Marc C Howell
(74) *Attorney, Agent, or Firm* — Sughrue Mion, PLLC (57) ABSTRACT

There is provided with a screw that is inserted into a cylinder an inside of which a material is loaded, and is rotatably supported in both end portions on an upstream side and a downstream side, or in an end portion on the upstream side, in the cylinder; a first kneading blade including a plurality of first blades that are helically provided on the screw and send the material toward the downstream side with rotation of the screw; and a second kneading blade including a second blade that is helically provided on the screw and returns the material, which is sent toward the downstream side by the first kneading blade, toward the upstream side, the number of blades in the second blade being smaller than the number of blades in the first blade.

12 Claims, 8 Drawing Sheets

(51) Int. Cl.
| | |
|---|---|
| *B29B 7/46* | (2006.01) |
| *B29C 48/55* | (2019.01) |
| *B29C 48/54* | (2019.01) |
| *B29C 48/575* | (2019.01) |
| *B29C 48/03* | (2019.01) |
| *B29C 48/40* | (2019.01) |
| *B29C 48/255* | (2019.01) |
| *B29C 48/535* | (2019.01) |

(52) U.S. Cl.
CPC ............. *B29C 48/54* (2019.02); *B29C 48/55* (2019.02); *B29C 48/575* (2019.02); *B29C 48/03* (2019.02); *B29C 48/2552* (2019.02); *B29C 48/404* (2019.02); *B29C 48/535* (2019.02)

(58) Field of Classification Search
USPC ...................................... 366/79, 83, 133, 319
See application file for complete search history.

(56) References Cited

U.S. PATENT DOCUMENTS

| | | | |
|---|---|---|---|
| 3,565,403 A | | 2/1971 | Matsuoka |
| 3,652,064 A | * | 3/1972 | Lehnen .................. B29C 47/60 198/661 |
| 3,802,670 A | | 4/1974 | Okada et al. |
| 3,856,278 A | * | 12/1974 | Eisenmann ..................... 366/84 |
| 3,874,090 A | | 4/1975 | McCracken |
| 4,246,224 A | | 1/1981 | Lehnen et al. |
| 5,750,158 A | | 5/1998 | Wissmann et al. |
| 5,792,500 A | * | 8/1998 | Housset ................ A01J 25/002 426/36 |
| 5,891,503 A | * | 4/1999 | Heck ........................ A21C 3/04 426/448 |
| 6,106,142 A | | 8/2000 | Rockstedt |
| 6,280,074 B1 | | 8/2001 | Kuroda et al. |
| 6,497,508 B1 | * | 12/2002 | Womer ............... B29C 47/6037 366/81 |
| 2004/0080064 A1 | | 4/2004 | MacPhee et al. |
| 2008/0254158 A1 | | 10/2008 | Holzel et al. |
| 2009/0122636 A1 | | 5/2009 | Yamane et al. |
| 2010/0193988 A1 | | 8/2010 | Carloff et al. |
| 2010/0271901 A1 | | 10/2010 | Yamaguchi et al. |

FOREIGN PATENT DOCUMENTS

| | | | |
|---|---|---|---|
| EP | 2662195 A1 | * | 11/2013 |
| JP | 550425 A | | 3/1993 |
| JP | 5228921 A | | 9/1993 |
| JP | 6122120 A | | 5/1994 |
| JP | 10128740 A | | 5/1998 |
| JP | 2000502300 A | | 2/2000 |
| JP | 1265936 A | | 9/2000 |
| JP | 20019830 A | | 1/2001 |
| JP | 2001129823 A | | 5/2001 |
| JP | 2002371137 A | | 12/2002 |
| JP | 200715348 A | | 1/2007 |
| JP | 2009113246 A | | 5/2009 |

OTHER PUBLICATIONS

International Search Report dated Aug. 7, 2012 from the International Searching Authority in counterpart application No. PCT/JP2012/063908.
Written Opinion dated Aug. 7, 2012 from the International Searching Authority in counterpart application No. PCT/JP2012/063908.
Communication dated Feb. 2, 2015, by the State Intellectual Property Office of PR China, in related Application No. 201280026596.1.

* cited by examiner

MATERIAL KNEADING APPARATUS AND MATERIAL KNEADING METHOD

TECHNICAL FIELD

The present invention relates to a material kneading apparatus and a material kneading method that continuously knead a material to be kneaded such as plastics, using a screw mechanism.

BACKGROUND ART

In the past, as a material kneading apparatus that continuously kneads a material to be kneaded such as plastics, a twin screw extruder has been known.

The twin screw extruder has a cylindrical cylinder, and two screws inserted into the cylinder so as to be in parallel with an axial direction of the cylinder and with each other. Each of the screws is rotatably supported at both ends on the upstream side and the downstream side in the cylinder, and has a kneading blade formed helically therein, the kneading blade sending the material to be kneaded. A motor is linked to an upstream side end portion of each screw, via a reducer. Each screw is rotated by the motor, which then rotates the kneading blades. With these rotations, the material to be kneaded, which has been loaded into the cylinder, is sent from the upstream side toward the downstream side, thereby to be kneaded, and then sent out to a granulating apparatus at the subsequent stage.

The twin screw extruder is configured of a transporting portion, a melt-kneading portion, a volatilizing-off portion, and a discharging portion, from the upstream side toward the downstream side. The melt-kneading portion has a kneading element where a sending blade, which is a kneading blade that sends the material to be kneaded toward the downstream side, is formed on the screw, and another kneading element that is provided on the downstream side with respect to the aforementioned kneading element and where a returning blade, which is a kneading blade that returns the material to be kneaded toward the upstream side, is formed on the screw. In the following, operations of the twin screw extruder will be briefly explained.

First, in the twin screw extruder, the motor is driven based on an input or the like from a user. With the drive of the motor, the twin screw extruder rotates screws in opposite directions to each other, thereby to rotate the kneading blades provided on the corresponding screws. With these rotations, in the transporting portion, the material to be kneaded, which has been loaded from a material loading opening provided in the cylinder, is sent out to the melt-kneading portion. In the melt-kneading portion, the material to be kneaded, which has been sent out from the transporting portion, is melted and kneaded by the rotating sending blade and returning blade, and then sent to the volatilizing-off portion. In the volatilizing-off portion, a so-called volatilization-off of gases or the like is performed, where the gases or the like, which have been generated when the material to be kneaded is melted and kneaded, are exhausted from a ventilation opening provided in the cylinder. Also, the material to be kneaded, which have been melted and kneaded (referred to as a melted material hereinafter), is sent out to the discharging portion. Next, in the discharging portion, the melted material is discharged from a material discharging opening provided in the cylinder.

Incidentally, as related art, the following patent literatures or the like are known.

CITATION LIST

Patent Literature

PTL 1: JP-A-5-228921
PTL 2: JP-A-2001-009830

SUMMARY OF THE INVENTION

Technical Problem

The related-art twin screw extruder allows the material to be kneaded to be completely melted by holding the material to be kneaded in the melt-kneading portion as long as possible, as described above. Therefore, as a processing capability of the material to be kneaded (for example, a production quantity of the material to be kneaded per unit time: kg/h) is reduced, kneading energy supplied from the melt-kneading portion to the material to be kneaded becomes excessive, which may lead to a problem in that an increase of production costs and degradation of the melted material are caused. As the countermeasures, there is a method that shortens a length of the melt-kneading portion along a cylinder axis direction, thereby to shorten a length filled with the material to be kneaded in the melt-kneading portion. In addition, as proposed in PTL 2, there is a method that makes a twisting angle of a returning blade portion, which returns the material to be kneaded toward the upstream side, with respect to a screw rotating direction greater than a twisting angle of a sending blade portion, which sends the material to be kneaded toward the downstream side, with respect to the screw rotating direction, thereby to shorten the length filled with the material to be kneaded and a holding time of the material to be kneaded in the melt-kneading portion. However, there is a problem in that when the processing capability of the material to be kneaded is tried to be increased by using these methods (for example, when a quantity of the material to be kneaded is increased), the kneading energy supplied from the melt-kneading portion becomes insufficient because the length filled with the material to be kneaded and the holding time are shortened. When the kneading energy becomes insufficient, it becomes difficult to completely melt the material to be kneaded, which leads to an increased failure of the melted material or the like. Therefore, the processing capability is reduced, eventually.

The present invention has been made in order to solve the problem(s) described above, and an object thereof is to provide a material kneading apparatus and a material kneading method that are capable of alleviating an increase of the kneading energy associated with a reduction of the processing capability of the material to be kneaded, and a reduction of the kneading energy associated with an increase of the processing capability of the material to be kneaded.

Solution to Problem

The above-describe object of the present invention is achieved by the following configuration.

(1) A material kneading apparatus comprising:
a screw that is inserted into a cylinder, an inside of which a material is loaded, and is rotatably supported in both end portions on an upstream side and a downstream side or in an end portion on the upstream side, in the cylinder;

a first kneading blade comprising a plurality of first blades that is helically provided on the screw and is configured to send the material toward the downstream side with rotation of the screw; and a second kneading blade comprising a second blade that is helically provided on the screw and is configured to return the material, which has been sent toward the downstream side by the first kneading blade, toward the upstream side, the second blade having a smaller number of blades than the number of blades of the first blades.

(2) The material kneading apparatus according to the above (1), wherein a plurality of the second blades are provided on the screw, wherein upstream side beginning ends of the second blades are engaged with downstream side terminal ends of third blades that are either one of the first blades, and wherein the upstream side beginning ends of the second blades are separated from downstream side terminal ends of fourth blades that are either one of the first blades.

(3) The material kneading apparatus according to the above (1) or (2), wherein the screw includes a plurality of sets of the first kneading blade and the second kneading blade.

(4) The material kneading apparatus according to the above (1), wherein the first kneading blade and the second kneading blade have an identical length in an axial direction of the cylinder.

(5) A method of kneading material, comprising:

rotating a screw, wherein the screw is inserted into a cylinder, an inside of which a material is loaded, and is rotatably supported in both end portions on an upstream side and a downstream side or in an end portion on the upstream side in the cylinder; and sending the loaded material toward the downstream side using a first kneading blade, the first kneading blade comprising a plurality of first blades that is helically provided on the screw and is configured to send the material toward the downstream side with rotation of the screw, and returning the material, which has been sent toward the downstream side, toward the upstream side using a second kneading blade, the second kneading blade comprising a second blade that is helically provided on the screw and is configured to return the material, which has been sent toward the downstream side by the first kneading blade, toward the upstream side, wherein the second blade has a smaller number of blades than the number of blades of the first blades.

DESCRIPTION OF EMBODIMENTS

In the following, embodiments of the present invention will be explained with reference to the drawings.

Figure 1:
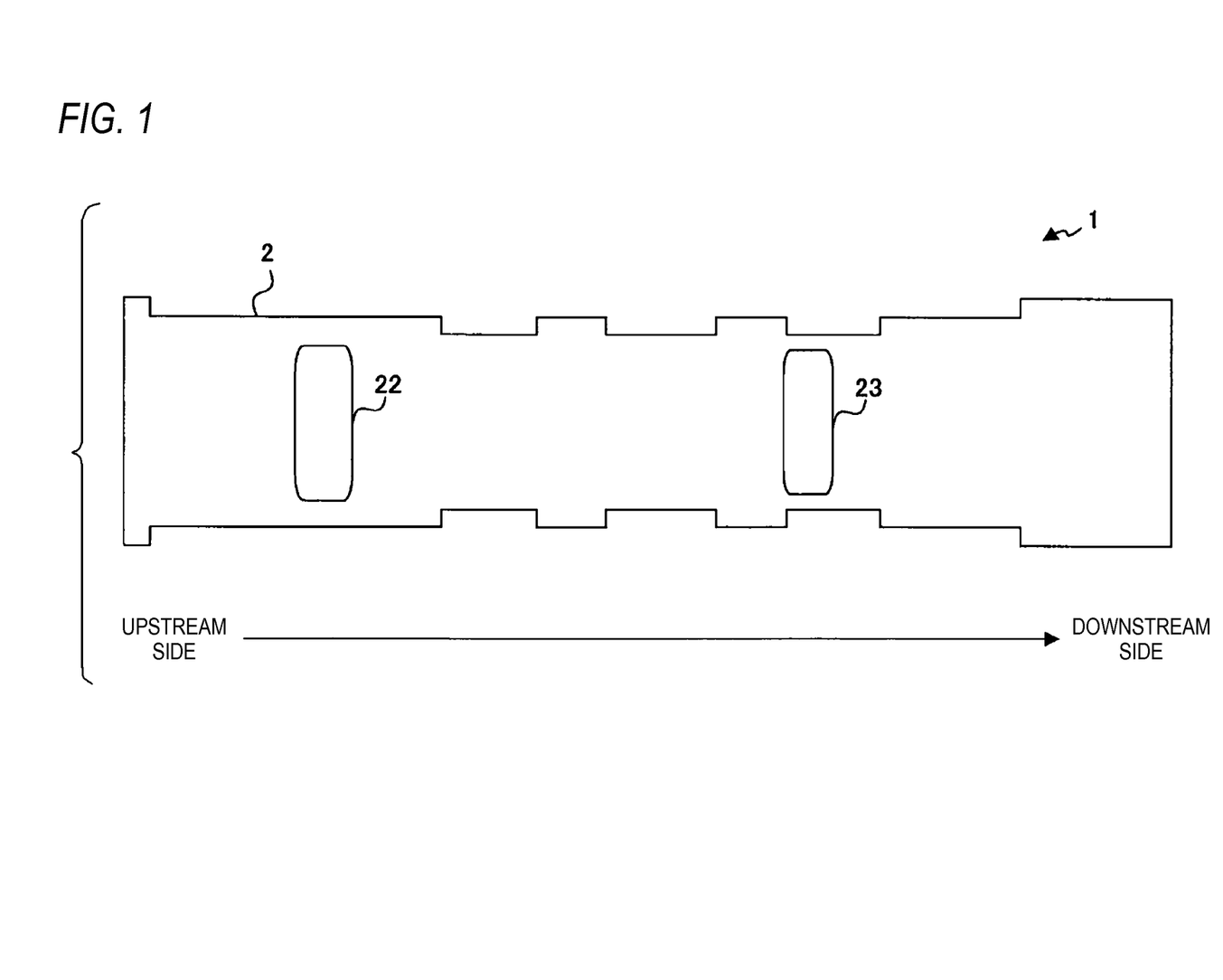
FIG. 1 is a simplified plan view illustrating a twin screw extruder according to an embodiment of the present invention.
Figure 2:
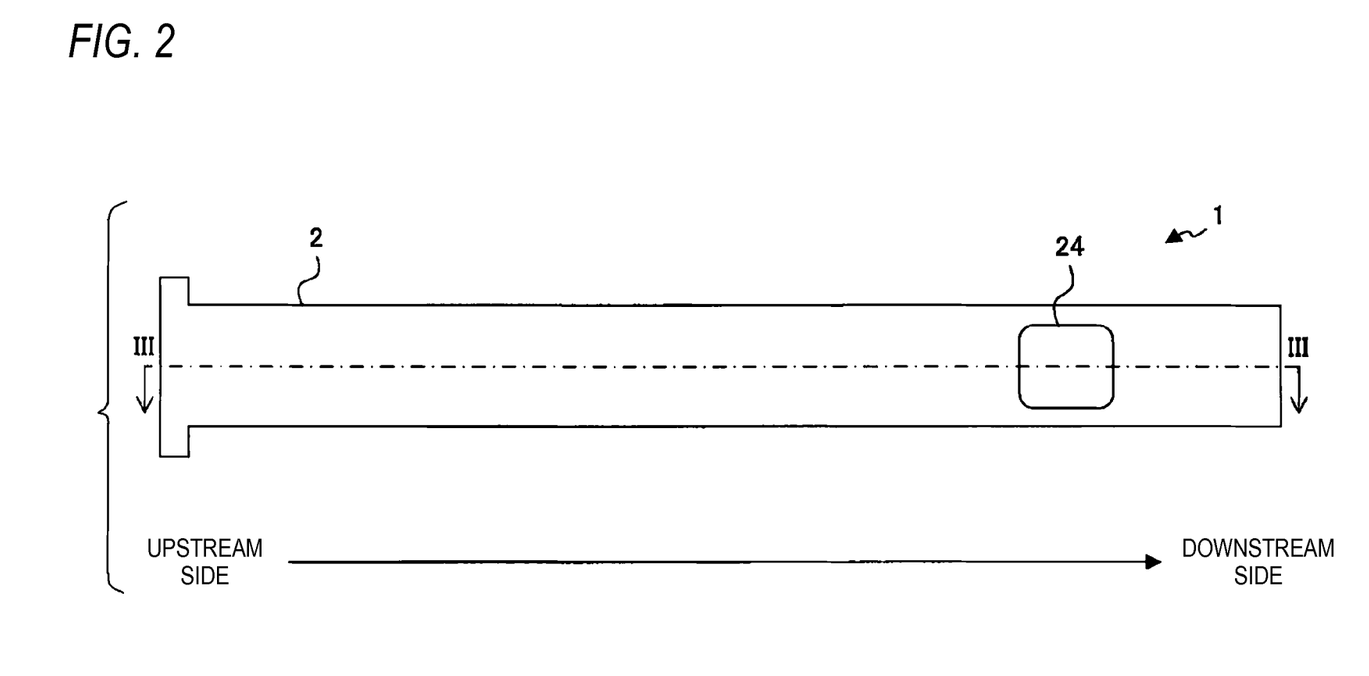
FIG. 2 is a simplified side view illustrating the twin screw extruder according to the embodiment of the present invention.
Figure 3:
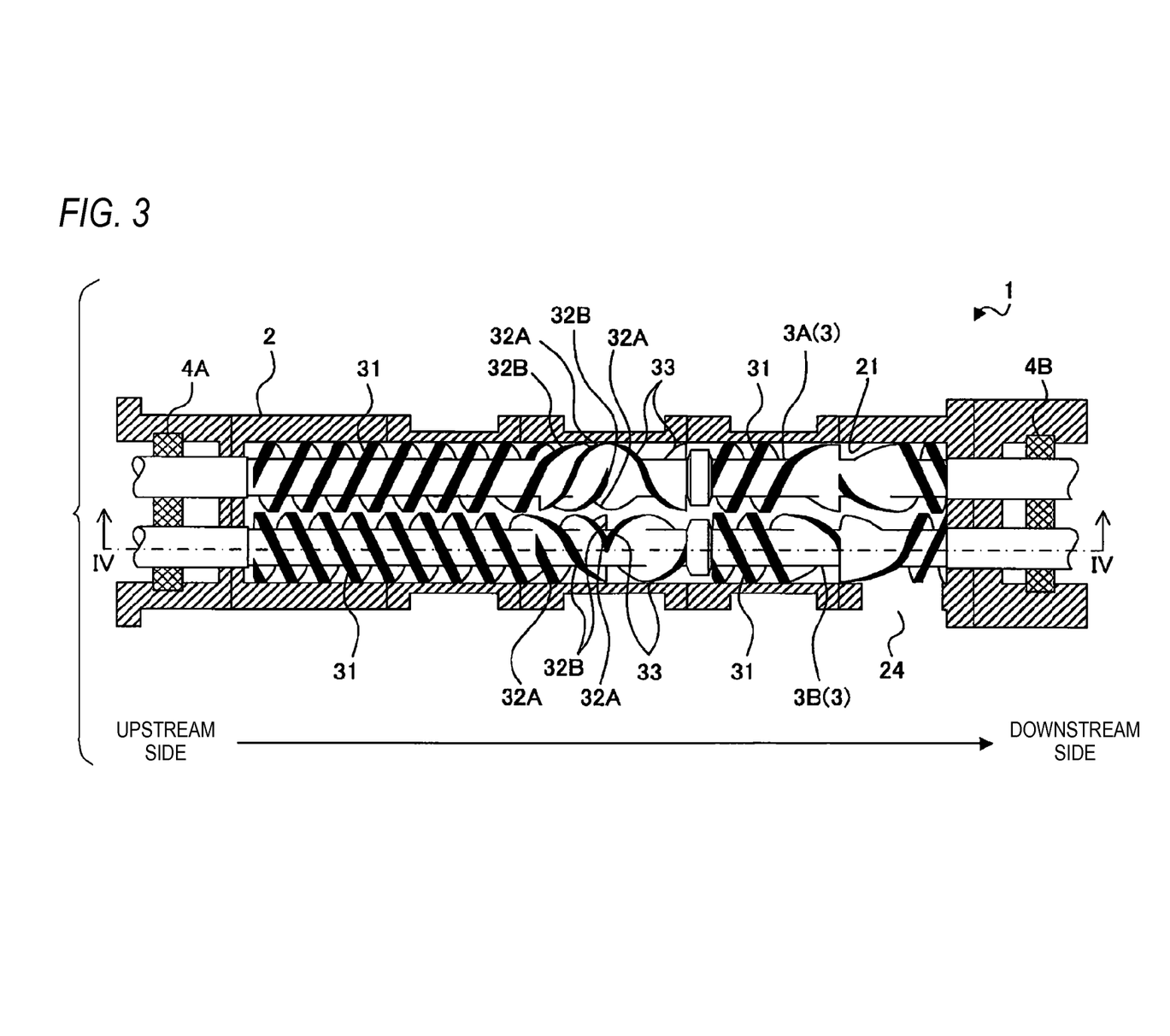
FIG. 3 is a cross-sectional view taken in the direction of arrows III-III in FIG. 2, illustrating a configuration of the twin screw extruder according to the embodiment of the present invention.
Figure 4:
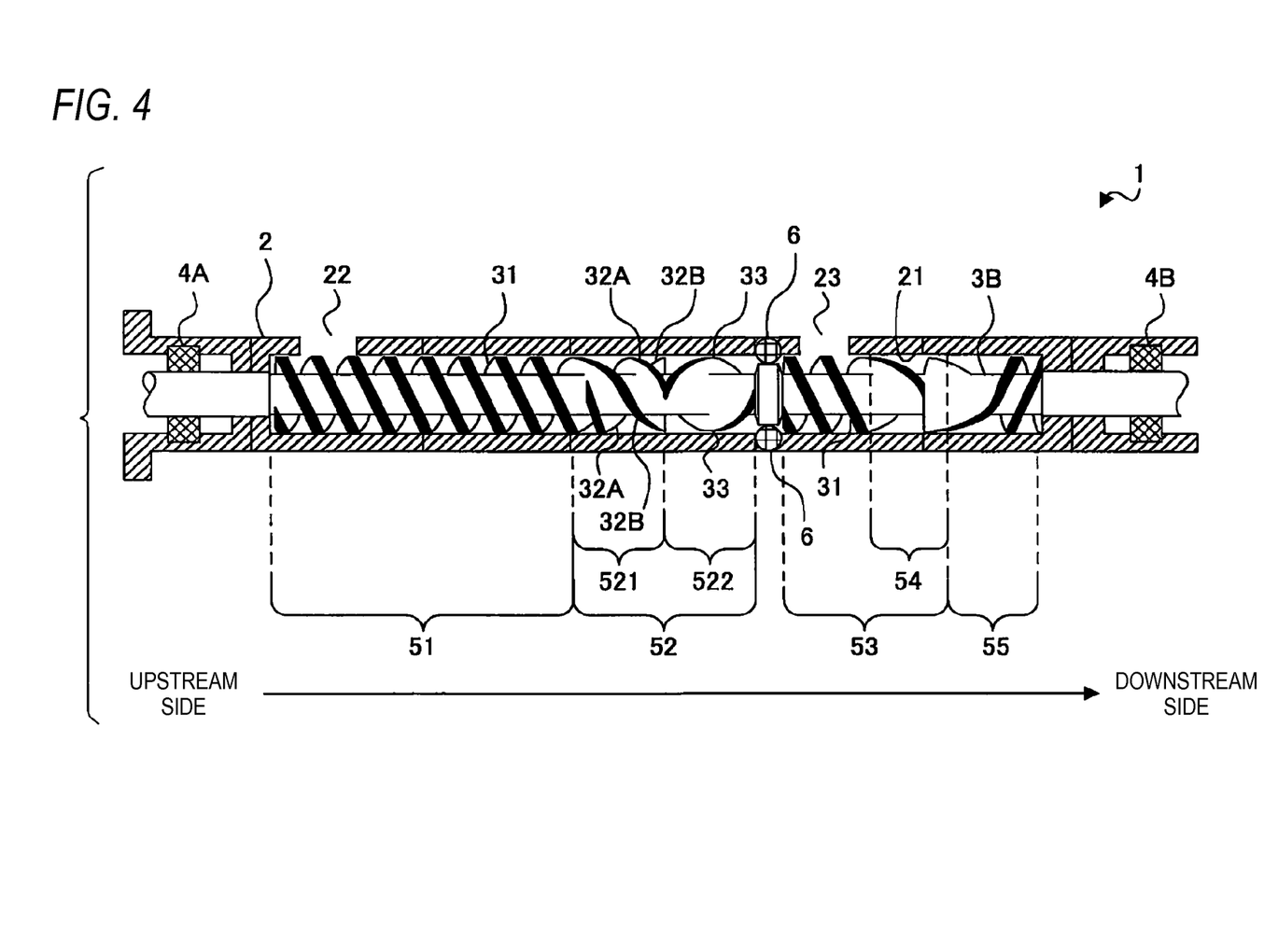
FIG. 4 is a cross-sectional view taken in the direction of arrows IV-IV in FIG. 3, illustrating the configuration of the twin screw extruder according to the embodiment of the present invention.

FIG. 1 is a simplified plan view illustrating a twin screw extruder 1 according to an embodiment of the present invention. FIG. 2 is a simplified side view illustrating the twin screw extruder 1 according to the embodiment of the present invention. FIG. 3 is a cross-sectional view taken in the direction of arrows III-III in FIG. 2, illustrating a configuration of the twin screw extruder 1 according to the embodiment of the present invention. FIG. 4 is a cross-sectional view taken in the direction of arrows IV-Iv in FIG. 3, illustrating the configuration of the twin screw extruder 1 according to the embodiment of the present invention. As illustrated in FIG. 1 through FIG. 4, the twin screw extruder 1 has a cylindrical cylinder 2 inside of which a screw hole 21 serving as a flow channel of a material to be kneaded is provided. An upper surface of the cylinder 2 is provided with a material loading opening 22 through which a material to be kneaded is loaded, and a ventilation opening 23 through which gases or the like generated at the time of melting the material to be kneaded are exhausted from the inside of the cylinder 2, in a direction from the upstream side through the downstream side, so that the openings 22, 23 are in communications with the screw hole 21. In addition, as illustrated in FIG. 2 and FIG. 3, a material discharging opening 24 through which the melted material is discharged is provided on the downstream side of the side surface of the cylinder 2 with respect to the ventilation opening 23, so as to be in communications with the screw hole 21.

Moreover, the twin screw extruder 1 has a screw 3A and a screw 3B that are inserted into the screw hole 21 so as to be in parallel with an axial direction of the cylinder 2, as illustrated in FIG. 3 and FIG. 4. From now on, the screw 3A and the screw 3B are referred to as a screw(s) 3 when explaining the screws without distinction. The screws 3 are rotatably supported by a bearing portion 4A and a bearing portion 4B provided in both ends on the upstream and downstream sides in the cylinder 2. Transporting blades 31 in a form of a two blade type that transport the material to be kneaded toward the downstream side are helically provided on corresponding circumferences of the screws 3, except for on a kneading element 521 described later. In addition, upstream side end portions of the screws 3 are connected to a motor(s) via a reducer(s) (not shown). When the screws 3 are rotated by the motor, the material to be kneaded, which has been loaded to the inside of the cylinder 2, can be sent out toward the downstream side. Incidentally, in this embodiment, because the screw 3A and the screw 3B are rotated in different directions from each other, helically winding directions of the screw 3A and the screw 3B are also different from each other.

In addition, as illustrated in FIG. 4, the twin screw extruder 1 has a transporting portion 51, a melt kneading portion 52, a volatilizing-off portion 53, a kneading portion 54, and a discharging portion 55, in a direction from the upstream side through the downstream side. In the transporting portion 51, the material to be kneaded, which has been loaded, is sent out to melt-kneading portion 52 with the rotations of the screws 3. In the melt-kneading portion 52, the material to be kneaded is melted and kneaded, and is sent out to the volatilizing-off portion 53. The melt-kneading portion 52 has the kneading element 521 and a kneading element 522. The material to be kneaded can be kneaded by the kneading element 521 and the kneading element 522. Details of the kneading element 521 and the kneading element 522 are explained later. In the volatilizing-off portion 53, gasses or the like, which are generated at the time of melting the material to be kneaded in the melt-kneading portion 52, are volatilized off, and exhausted from the ventilation opening 23. At this time, the material to be kneaded, from which the gasses or the like have been volatilized off, is sent out to the kneading portion 54, and kneaded again in the kneading portion 54. After this, the melted material is sent out to the discharging portion 55. In the discharging portion 55, the melted material is discharged from the material discharging opening 24.

In addition, in a middle position of the cylinder 2 in a longitudinal direction (the axial direction of the cylinder 2), namely a part between the melt-kneading portion 52 and the volatilizing-off portion 53, a kneading adjustment mechanism 6 is provided so as to oppose an upper and an lower position of an inner wall thereof. The kneading adjustment mechanism 6 alters an area of the flow channel (a cross-sectional area of the screw hole 21) through which the material to be kneaded passes, by adjusting an opening degree. The twin screw extruder 1 can adjust a holding time and a filling rate of the material to be kneaded in the melt-kneading portion 52 by adjusting the opening degree using the kneading adjustment mechanism 6. The kneading adjustment mechanism 6 is, for example, a rotary slot bar of which part inserted into a cylinder adjusts an opening degree from a full closed state, where a gap with respect to an outer diameter of a screw is reduced, to a full open state, where the gap becomes substantially the same as an inner diameter of the cylinder, by rotating a gate bar that has been machined to have a slightly larger diameter than the outer diameter of the screw positioned in the position.

Incidentally, the melted material discharged from the material discharging opening 24 by the discharging portion 55 is sent to a granulating apparatus by an un-illustrated gear pump. A foreign material eliminating apparatus (a screen changer) is disposed between the gear pump and the granulating apparatus. In addition, other machining apparatuses may be disposed on the downstream side of the granulating apparatus.

Figure 5:
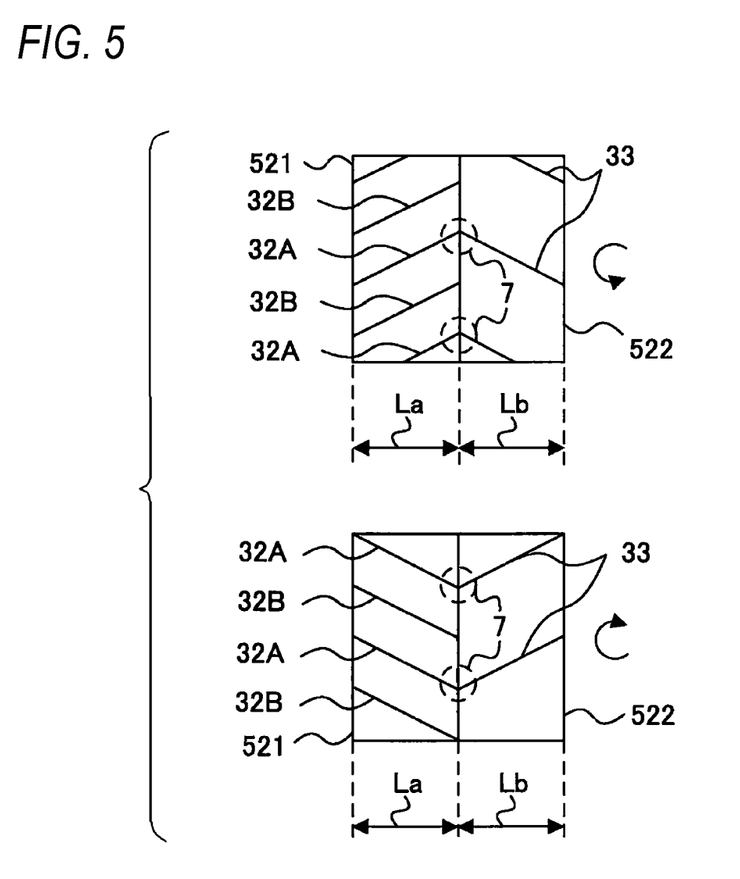
FIG. 5 is schematic views schematically illustrating kneading elements according to an embodiment of the present invention.

Next, the kneading element 521 and the kneading element 522 mentioned above are explained in detail, with reference to FIG. 3 through FIG. 5.

As illustrated in FIG. 3 and FIG. 4, sending blades 32A and sending blades 32B that send the material to be kneaded toward the downstream side are helically provided in the kneading element 521. On the other hand, the kneading element 522 is positioned on the downstream side with respect to the kneading element 521. Returning blades 33 that return the material to be kneaded toward the upstream side are helically provided in the kneading element 522.

FIG. 5 is schematic views schematically illustrating the kneading elements 521 and the kneading elements 522 according to this embodiment 15 of the present invention. As illustrated in FIG. 5, each of the kneading elements 521 in the screws 3 has the sending blades 32A in a form of a two blade type and the sending blades 32B in a form of a two blade type, and thus a total of 4 blades. And each of the kneading elements 522 has the returning blades 33 in a form of a two blade type. So, the total number of the blades (the number of threads) in the sending blades 32A and the sending blades 32B that are possessed by each of the kneading elements 521 is greater than the number of the blades in the returning blades 33 that are possessed by each of the kneading elements 522. In other words, the kneading elements 522 have the returning blades 33 whose number of the blades is smaller than the total number of the blades in the sending blades 32A and the sending blades 32B. Lengths of the kneading elements 521 and the kneading elements 522 in the axial direction of the cylinder 2 are 1.0D. D indicates an inner diameter of the cylinder 2. Further, the number of starts of the screw threads of the blades in the sending blades 32A and the sending blades 32B is greater than the number of the starts of the screw threads blades 32B.

The sending blades 32A are provided as a so-called end-face coupling type where terminal ends of the blades (downstream side end portions of the sending blades 32A) coincide with corresponding beginning ends of the returning blades 33 (upstream side end portions on the returning blades 33). In other words, the terminal ends of the sending blades 32A are engaged with the corresponding beginning ends of the returning blades 33. Reference symbols 7 in FIG. 5 depict the engaging portions. In the screws 3, the sending blades 32A and the returning blades 33 are continuously provided so that the helical winding directions become different from each other in the engaging portions 7 as boundaries. On the other hand, the sending blades 32B are provided so that terminal ends thereof are not end-face coupled with the beginning ends of the returning blades 33. In other words, the terminal ends of the sending blades 32B and the beginning ends of the returning blades 33 are separated from each other. With such a configuration, in a case of an operation with a reduced processing capability of the material to be kneaded, it becomes difficult to fill the kneading elements 521 with the material to be kneaded. On the other hand, in a case of an operation with an enhanced processing capability of the material to be kneaded, the sending blades 32A and the sending blades 32B contribute to kneading of the material to be kneaded in the melt-kneading portion 52 for the sake of the kneading element 521 being filled with the material to be kneaded. The twin screw extruder 1 according to this embodiment is configured as described above.

Next, a kneading method of the material to be kneaded in the twin screw extruder 1 is explained.

First, in the twin screw extruder 1, the motor is driven based on an input or the like from a user. With the drive of the motor, the twin screw extruder 1 rotates the screw 3A and the screw 3B in the opposite directions to each other, thereby to rotate the transporting blades 31 in the opposite directions to each other. After the rotations of the screws 3, the material to be kneaded is loaded from the material loading opening 22 to the inside of the cylinder 2. After the loading, the material to be kneaded, which has been loaded to the inside of the cylinder 2, is sent out to the melt-kneading portion 52 with the above described rotations in the transporting portion 51. After having been sent out from the transporting portion 51, the material to be kneaded is melted and kneaded by the rotating sending blade 32B and returning blades 33 in the melt-kneading portion 52, and then is sent out to the volatilizing-off portion 53. This melt-kneading is performed with strong shear force applied to the material to be kneaded by an inner wall surface of the cylinder 2, the sending blades 32A, the sending blades 32B, and the returning blades 33.

After the melted material, which has been melted and kneaded, is sent out, gasses is volatilized off from the melted material in the volatilizing-off portion 53, and the melted material is sent to the kneading portion 54 by the transporting blades 31 that transport the melted material toward the downstream side. The melted material is kneaded again, sent out to the discharging portion 55, and then discharged from the material discharging opening 24.

According to this embodiment, in a case of the operation with a reduced processing capability of the material to be kneaded in an attempt to reduce the filling rate of the material to be kneaded in the melt-kneading portion 52, the filling length and the holding time of the material to be kneaded in the melt-kneading portion 52 can be reduced by the sending blades 32B whose terminal ends are separated from the beginning ends of the returning blades 33. Therefore, the kneading energy applied to the material to be kneaded from the melt-kneading portion 52 can be reduced in the operation with the reduced processing capability of the material to be kneaded. In addition, in a case of the operation with an enhanced processing capability of the material to be kneaded in an attempt to increase the filling rate, the melt-kneading portion 52 is filled with the material to be kneaded. With being filled with the material to be kneaded, the kneading energy applied to the material to be kneaded from the melt-kneading portion 52 can be increased, thereby to fully melt the material to be kneaded even in the operation with the enhanced processing capability.

In a similar manner, when the area of the flow channel is expanded by the kneading adjustment mechanism 6 thereby to reduce the filling rate and the holding time, the kneading energy applied to the material to be kneaded from the melt-kneading portion 52 can be reduced because a transporting capability of the sending blades 32B is exerted. In contrast, when the area of the flow channel is reduced by the kneading adjustment mechanism 6 thereby to increase the filling rate and the holding time, the kneading energy applied to the material to be kneaded from the melt-kneading portion 52 can be increased because a kneading capability of the sending blades 32A is exerted. Therefore, a controlling range of the kneading energy (the kneading energy applied to the material to be kneaded by adjusting the opening degree) can be expanded.

Incidentally, in this embodiment, one set of the kneading element 521 and the kneading element 522 is provided in an order of the kneading element 521 and the kneading element 522 from the upstream side in the twin screw extruder 1. However, plural sets of the kneading elements 521 and the kneading elements 522 may be provided for the screws 3.

In addition, in this embodiment, while the screws 3 of a non-engaging opposite direction type is used as illustrated in FIG. 3 and FIG. 4, the present invention is not limited to this type, but may be applicable to a screw extruder of an engaging type or an identical direction type. Additionally, the screws 3 may be supported in their both end portions on the upstream side and the downstream side, or may be supported in their upstream end portion.

In addition, it has been explained that the transport blades 31, the sending blades 32A, the sending blades 32B, and the returning blades 33 are formed respectively in a form of a two blade type at the screw 3. However, the present invention is not limited to this type, but the sending blade 32A and the sending blade 32B may be formed at least as a single blade type and the total number of the blades in the sending blade 32A and the sending blade 32B may be greater than the number of the blades in the returning blade 33.

While in this embodiment the ventilation opening 23 is provided at a wall surface of the cylinder 2 in the volatilizing-off portion 53, the present invention is not limited to this. The ventilation opening 23 is not necessarily provided and the kneading portion 54 is not necessarily formed for the screws 3.

WORKING EXAMPLES

Figure 6:
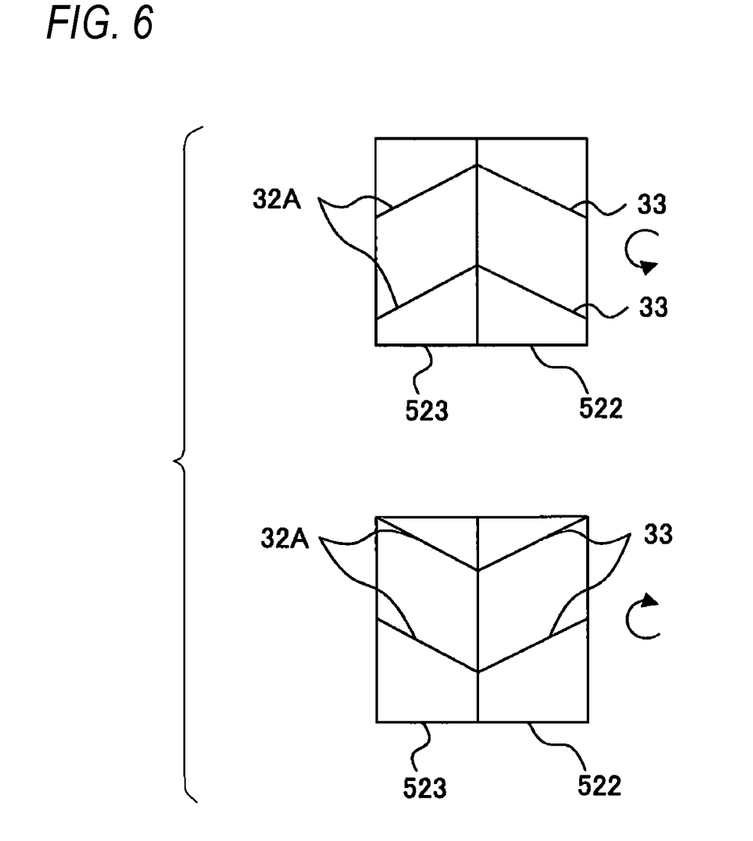
FIG. 6 is a schematic view schematically illustrating a kneading element different from the kneading elements according to the embodiment of the present invention.

Specific energy (consumption power/the processing capability) applied to the material to be kneaded in the melt-kneading portion 52 and specific energy applied to the material to be kneaded in a melt-kneading portion that has a kneading element 523 where the sending blade 32B was not formed, as illustrated in FIG. 6 (referred to as a melt-kneading portion X, hereinafter), instead of kneading element 521, were investigated. In this investigation, the following equipment and material were used.

Twin screw extruder: CIM90, manufactured by The Japan Steel Works, LTD

Material to be kneaded: HDPE (High Density Polyethylene) (MI=0.2/5 kg load)

Working Example 1

With a screw rotational speed set to be 280 rpm and an opening degree of the kneading adjustment mechanism 6 set constant, the specific energy applied to the material to be kneaded in the melt-kneading portion 52 at the time of processing capability 210 kg/h, and the specific energy in the melt-kneading portion 52 at the time of the capacity limit of the transporting portion 51 (the limit of the processing capacity) were measured. The measurement results are illustrated in FIG. 7.

Comparison Example 1

The specific energy applied in the melt-kneading portion X under the same conditions as those in Working Example 1 were measured. The measurement results are illustrated in FIG. 7.

Figure 7:
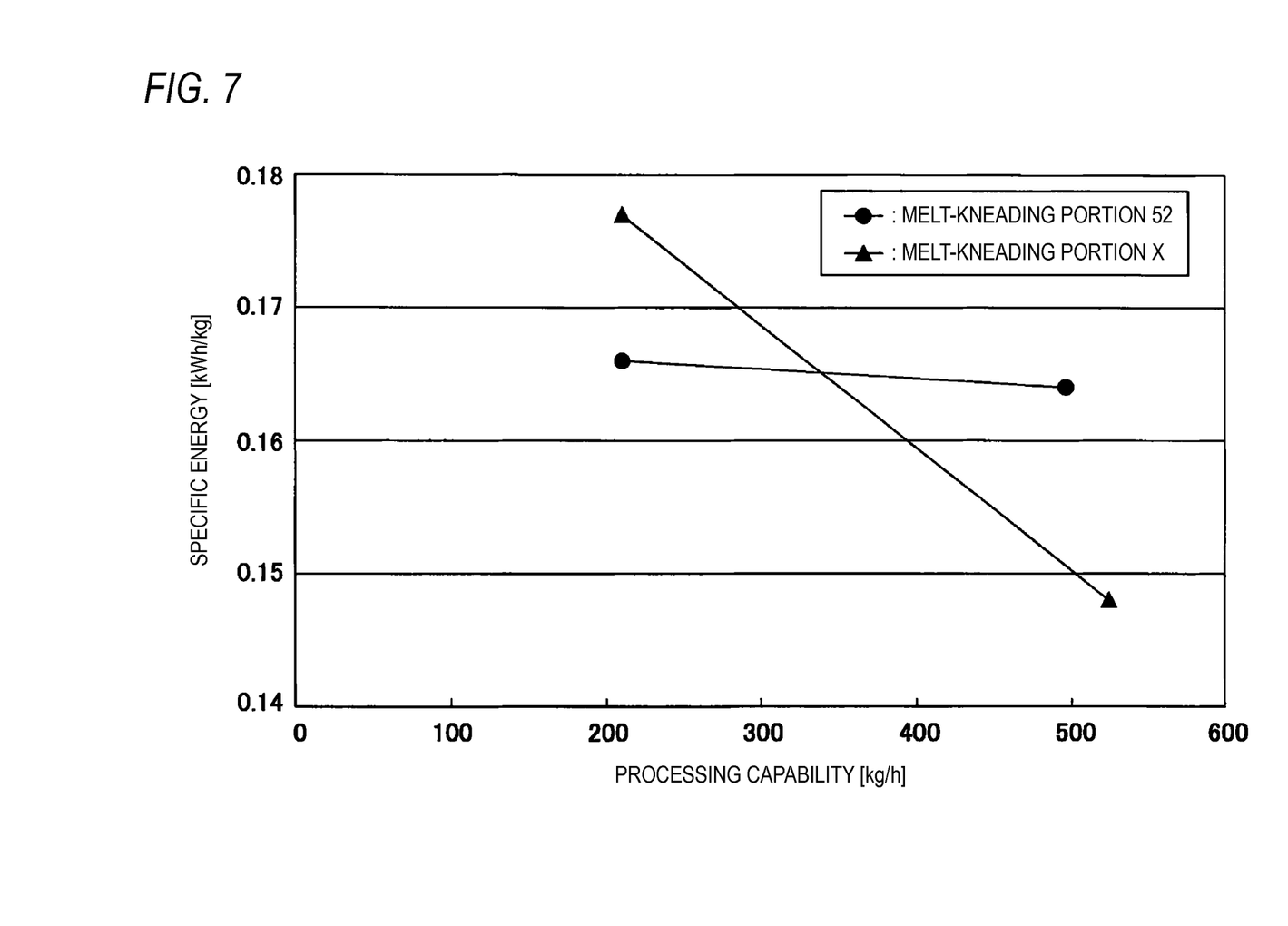
FIG. 7 is a graph illustrating measurement results of Working Example 1 and Comparison Example 1.

As illustrated in FIG. 7, the melt-kneading portion 52 can reduce the specific energy at a reduced processing capability, and increase the specific energy at an increased processing capability, compared with the melt-kneading portion X. With this, it has been confirmed that according to Working Example 1, an increase of the kneading energy associated with a reduction of the processing capability of the material to be kneaded, and a reduction of the kneading energy associated with an increase of the processing capability of the material to be kneaded are alleviated.

Working Example 2

With a screw rotational speed set to be 400 rpm and the processing capability set to be 300 kg/h, the specific energy applied to the material to be kneaded in the melt-kneading portion 52 was measured, while the area of the flow channel was adjusted by the kneading adjustment mechanism 6. The measurement results are illustrated in FIG. 8.

Comparison Example 2

The specific energy applied to the material to be kneaded in the melt-kneading portion X under the same conditions as those of Working Example 2 was measured. The measurement results are illustrated in FIG. 8.

Figure 8:
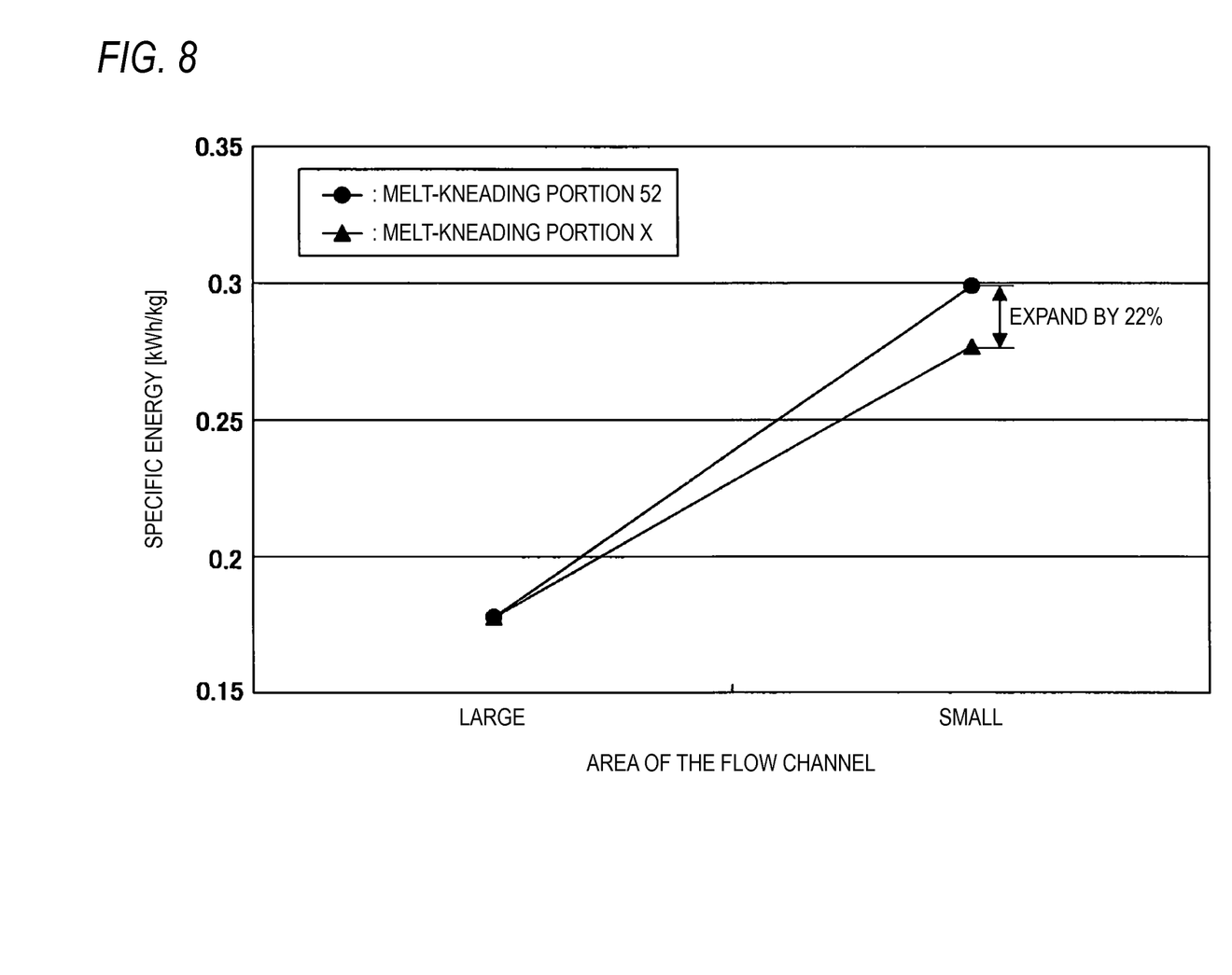
FIG. 8 is a graph illustrating measurement results of Working Example 2 and Comparison Example 2.

As illustrated in FIG. 8, the melt-kneading portion 52 can expand an operation range when using the kneading adjustment mechanism 6 by about 22%, compared with the melt-kneading portion X.

Incidentally, a material kneading apparatus recited in the Claim(s) is, for example, a twin screw extruder 1 in the foregoing embodiments. A cylinder is for example, the cylinder 2; a screw is, for example, the screw 3. A first kneading blade is, for example, the kneading element 521; and a second kneading blade is, for example, the kneading element 522. A first blade is, for example, the sending blades 32A and the sending blades 32B; and a second blade is, for example, the returning blades 33. A third blade is, for example, the sending blades 32A; and a fourth blade is, for example, the sending blade 32B.

The present invention is not limited to the above-described embodiments, but may be arbitrarily altered or improved. In addition, materials, shapes, dimensions, numerals, forms, numbers, disposition places of each constituting element are arbitrary, as long as the present invention can be realized, and not limited.

While the present invention has been explained in detail and with reference to the specific embodiments, it is apparent to those skilled in the pertinent art that the present invention can be altered or modified without departing from a sprit and range of the present invention.

The present invention is based on a Japanese Patent Application (JP2011-19941), filed on May 30, 2011, the contents of which are hereby incorporated herein by reference.

Here, features of the embodiments of the material kneading apparatus and the material kneading method according to the present invention are briefly described respectively in the following [1] through [5].

[1] A material kneading apparatus (1) comprising:
a screw (3) that is inserted into a cylinder (2), an inside of which a material is loaded, and is rotatably supported in both end portions on an upstream side and a downstream side, or in an end portion on the upstream side, in the cylinder (2);
a first kneading blade (521) comprising a plurality of first blades (32A, 32B) that is helically provided on the screw (3) and is configured to send the material toward the downstream side with rotation of the screw (3); and
a second kneading blade (522) comprising a second blade (33) that is helically provided on the screw (3) and is configured to return the material, which has been sent toward the downstream side by the first kneading blade (521), toward the upstream side, the second blade having a smaller number of blades than the number of blades of the first blades.

[2] The material kneading apparatus (1) according to the above [1],
wherein a plurality of the second blades (33) are provided on the screw (3),
wherein upstream side beginning ends of the second blades (33) are engaged with downstream side terminal ends of third blades (32A) that are either one of the first blades (32A, 32B), and
wherein the upstream side beginning ends of the second blades (33) are separated from downstream side terminal ends of fourth blades (32B) that are either one of the first blades (32A, 32B).

[3] The material kneading apparatus (1) according to the above [1] or [2], wherein the screw (3) includes a plurality of sets of the first kneading blade (521) and the second kneading blade (522).

[4] The material kneading apparatus (1) according to the above [1], wherein the first kneading blade (521) and the second kneading blade (522) have an identical length in an axial direction of the cylinder (2).

[5] A method of kneading material, comprising:
rotating a screw (3), wherein the screw is inserted into a cylinder (2), an inside of which a material is loaded, and is rotatably supported in both end portions on an upstream side and a downstream side or in an end portion on the upstream side in the cylinder (2); and
sending the loaded material toward the downstream side using a first kneading blade (521), the first kneading blade comprising a plurality of first blades (32A, 32B) that is helically provided on the screw (3) and is configured to send the material toward the downstream side with rotation of the screw (3), and returning the material, which has been sent toward the downstream side, toward the upstream side using a second kneading blade (522), the second kneading blade comprising a second blade (33) that is helically provided on the screw (3) and is configured to return the material, which has been sent toward the downstream side by the first kneading blade (521), toward the upstream side, wherein the second blade has a smaller number of blades than the number of blades of the first blades.

INDUSTRIAL APPLICABILITY

According to the present invention, an increase of the kneading energy associated with a reduction of the processing capability of the material to be kneaded and a reduction of the kneading energy associated with an increase of the processing capability of the material to be kneaded are alleviated.

REFERENCE SIGNS LIST 1 twin screw extruder
2 cylinder
3, 3A, 3B screw
4A, 4B bearing portion
6 kneading adjustment mechanism
7 engaging portion
21 screw hole
22 material loading opening
23 ventilation opening
24 material discharging opening
31 transporting blade
32A, 32B sending blade
33 returning blade
51 transporting portion
52 melt-kneading portion
53 volatilizing-off portion
54 kneading portion
55 discharging portion
521, 522 kneading element

The invention claimed is:
1. A material kneading apparatus comprising:
a screw inserted into a cylinder, an inside of which a material is loaded, and the screw is rotatably supported at both an end portion on an upstream side and an end portion on a downstream side or at the end portion on the upstream side, in the cylinder;
a first kneading blade comprising a plurality of sending blades that are helically provided on the screw and configured to send the material toward the downstream side upon rotation of the screw; and a second kneading blade comprising a return blade that is helically provided on the screw and is configured to return the material, which has been sent toward the downstream side by the first kneading blade, toward the upstream side, the second kneading blade having a smaller number of starts of screw threads than the number of starts of screw threads of the first kneading blade, wherein a plurality of the return blades are provided on the screw, wherein the plurality of sending blades comprises a first blade and a second blade, wherein an end of the return blade at the upstream side engages an end of the first blade at the downstream side, and wherein the end of the return blade at the upstream side is separated from an end of the second blade at the downstream side.

2. The material kneading apparatus according to claim 1, wherein the screw includes a plurality of the first kneading blades and a plurality of the second kneading blades.

3. The material kneading apparatus according to claim 1, wherein the first kneading blade and the second kneading blade have an identical length in an axial direction of the cylinder.

4. The material kneading apparatus according to claim 1, wherein a distance between the threads of the sending blades is smaller than a distance between the threads of the return blade.

5. The material kneading apparatus according to claim 1, wherein a pitch of the sending blades is smaller than a pitch of the return blade.

6. The material kneading apparatus according to claim 1, wherein one of the sending blades transitions into the return blade.

7. The material kneading apparatus according to claim 1, wherein one of the sending blades is separate from the return blade and creates a space at the downstream end of the sending blades.

8. A method of kneading material, comprising:
rotating a screw, wherein the screw is inserted into a cylinder, an inside of which a material is loaded, and the screw is rotatably supported at both an end portion on an upstream side and an end portion on a downstream side or at the end portion on the upstream side in the cylinder; and sending the loaded material toward the downstream side using a first kneading blade, the first kneading blade comprising a plurality of sending blades that are helically provided on the screw and the first kneading blade is configured to send the material toward the downstream side upon rotation of the screw, and returning the material, which has been sent toward the downstream side, toward the upstream side using a second kneading blade, the second kneading blade comprising blade that is helically provided on the screw and is configured to return the material, which has been sent toward the downstream side by the first kneading blade, toward the upstream side, wherein the second kneading blade has a smaller number of starts of screw threads than the number of starts of screw threads of the first kneading blade, wherein a plurality of the second kneading blades are provided on the screw, wherein the plurality of first kneading blades comprises a first blade and a second blade, wherein an end of the second kneading blade at the upstream side engages an end of the first blade at the downstream side, and wherein the end of the second kneading blade at the upstream side is separated from an end of the second blade at the downstream side.

9. A material kneading apparatus comprising:
a screw inserted into a cylinder and rotatably supported in the cylinder at an end portion of the screw;

a first kneading blade comprising a plurality of sending blades that are helically provided on the screw and configured to send the material toward the downstream side upon rotation of the screw; and a second kneading blade comprising a return blade that is helically provided on the screw and configured to return the material toward the upstream side, wherein the plurality of sending blades comprises a first blade following a first helical path and a second blade following a second helical path, which is different from the first helical path, the first helical path and the second helical path turn about a same axis of the screw, wherein the first kneading blade is provided on the screw at a position upstream from the second kneading blade, and the second kneading blade having a smaller number of starts of screw threads than the number of starts of screw threads of the first kneading blade, wherein an end of the return blade at the upstream side engages an end of the first blade at the downstream side, and wherein the end of the return blade at the upstream side is separated from an end of the second blade at the downstream side.

10. The material kneading apparatus according to claim 9, wherein a distance between the threads of the first kneading blade is smaller than a distance between the threads of the second kneading blade.

11. The material kneading apparatus according to claim 9, wherein one of the first blade or the second blade transitions into the return blade.

12. The material kneading apparatus according to claim 9, wherein a pitch of the sending blades is smaller than a pitch of the return blade.

* * * * *